April 12, 1938.                A. Y. DODGE                 2,113,722
                              ONE-WAY CLUTCH
                          Filed Sept. 9, 1935            3 Sheets-Sheet 1

INVENTOR.
ADIEL Y. DODGE
BY McConkey & Booth
ATTORNEY.

April 12, 1938.    A. Y. DODGE    2,113,722
ONE-WAY CLUTCH
Filed Sept. 9, 1935    3 Sheets-Sheet 2
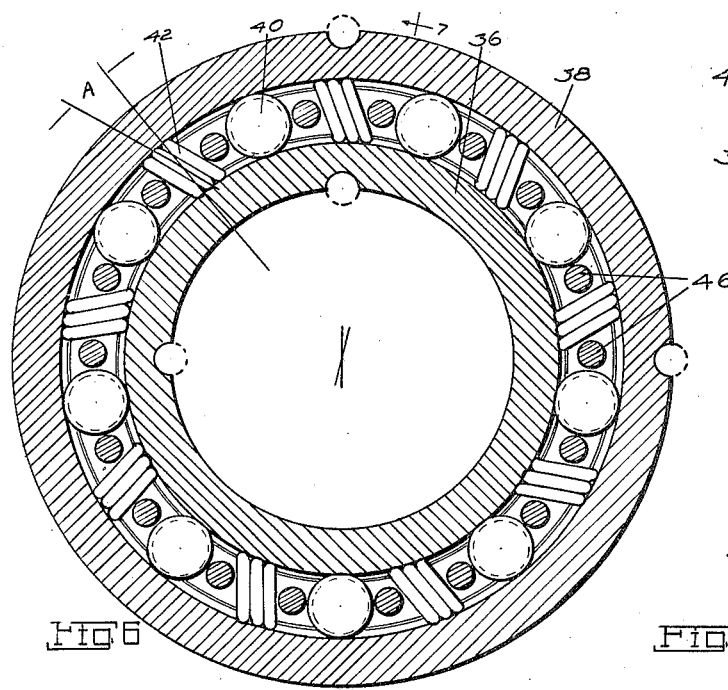
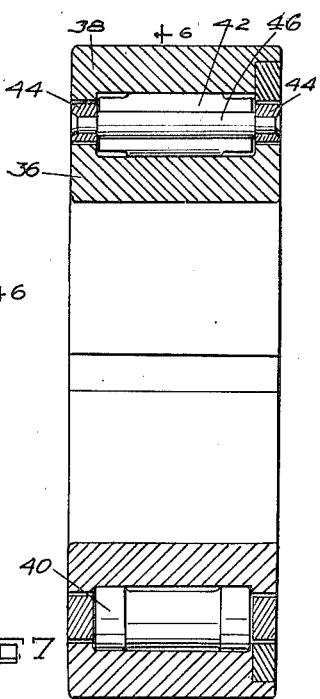
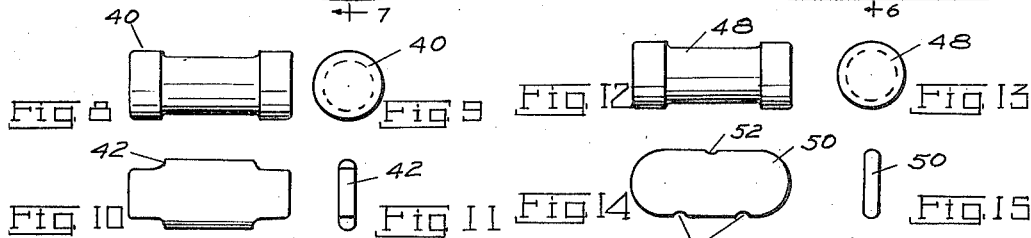
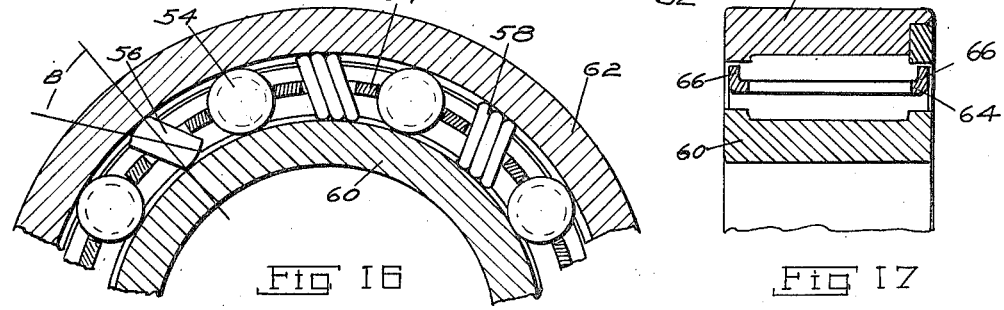
INVENTOR.
ADIEL Y DODGE
BY McConkey & Booth
ATTORNEYS.

April 12, 1938.  A. Y. DODGE  2,113,722
ONE-WAY CLUTCH
Filed Sept. 9, 1935  3 Sheets-Sheet 3
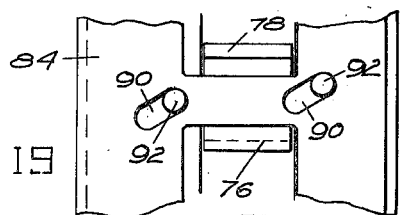
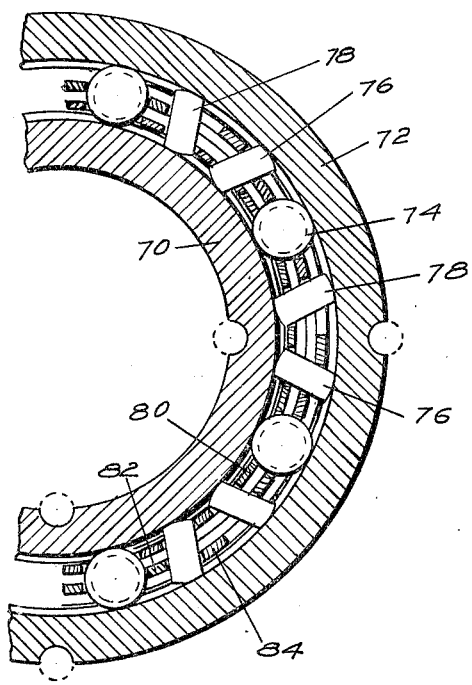
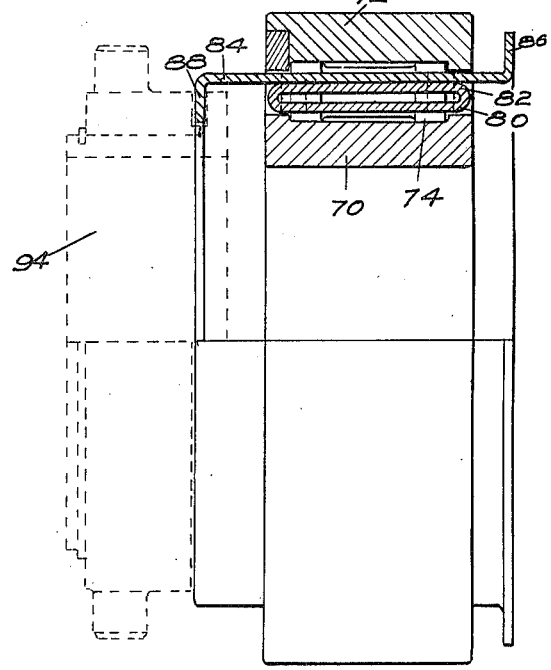
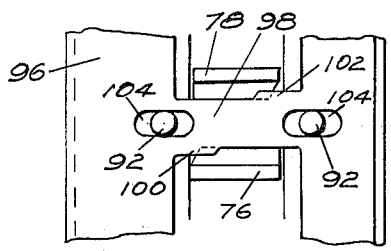
INVENTOR.
ADIEL Y DODGE
BY McConkey & Booth
ATTORNEYS.

Patented Apr. 12, 1938

2,113,722

UNITED STATES PATENT OFFICE 2,113,722

ONE-WAY CLUTCH

Adiel Y. Dodge, South Bend, Ind.

Application September 9, 1935, Serial No. 39,674

18 Claims. (Cl. 192—43)

This invention relates to one-way clutches and more particularly to one-way clutches including anti-friction elements to serve as bearings.

One of the objects of the invention is to provide a one-way clutch which is simple in construction and positive and reliable in operation.

Another object is to provide a one-way clutch including cylindrical races and grippers to lock the races against relative rotation in one direction.

Still another object of the invention is to provide a combined one-way clutch and bearing which prevents relative rotation of a pair of members in one direction but acts as a bearing when the members rotate in the other direction. Adjusting means may also be provided to reverse the direction of action of the clutch or to lock it against rotation in either direction or release it for free rotation in either direction.

One desirable construction embodying the invention includes inner and outer concentric, cylindrical races between which is mounted a cage including a series of spaced rods. Between alternate pairs of the rods anti-friction rollers are mounted and grippers are mounted between the other pairs of rods adapted to rock or tilt in one direction to engage the races and prevent relative rotation thereof and in the other direction to release the races.

According to an important feature of the invention, the rollers are preferably formed with reduced central portions and the grippers with reduced ends to facilitate lubricant flow. If desired, oil grooves may also be provided in the central portions of the grippers. This enables the grippers and rollers to be properly lubricated while over running and provides an even distribution of lubricant over the races, the grippers and the rollers.

The cage is arranged to space the rollers properly and also to support the grippers in such a position as to permit over running in one direction but to move quickly into locking position upon rotation in the other direction to lock the races together without the use of springs.

Other objects, advantages, and novel features including novel arrangements of parts and novel elements will be apparent from the following detailed description when taken in connection with the accompanying drawings, in which:

Figure 6 is a section with parts in elevation on the line 6—6 of Figure 7 illustrating a modified construction;

Figure 7 is a section on the line 7—7 of Figure 6;

Figures 8 to 11 are detail views of the grippers and rollers of Figures 6 and 7;

Figures 12 to 15 are views similar to Figures 8 to 11 illustrating a modified construction;

Figure 16 is a partial view similar to Figure 1 illustrating a further modification;

Figure 17 is a partial section at right angles to Figure 16;

Figure 18 is a partial view similar to Figure 1 of a further modification;

Figure 19 is a partial view at right angles to Figure 18 with the outer race removed;

Figure 20 is a view at right angles to Figure 18 with parts in section illustrating a means for controlling the clutch;

Figure 21 is a view similar to Figure 19 showing a modified arrangement; and

Figure 22 is a perspective view of a cage.

Figure 2:
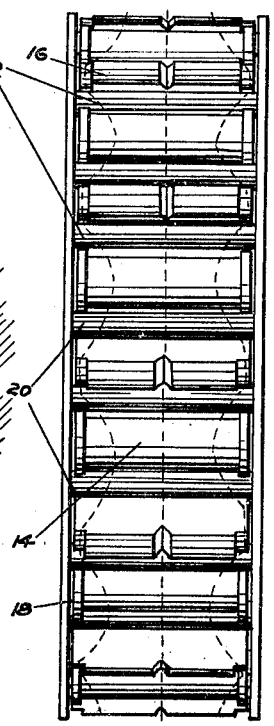
Figure 2 is a view at right angles to Figure 1 with the outer race removed.

The combined clutch and bearing is illustrated as arranged between inner and outer concentric races 10 and 12 and comprises a series of anti-friction rollers 14 and a series of grippers 16 alternately arranged between the races. The grippers and rollers are held in place by a cage indicated at 18 in Figure 2 which includes a series of cross rods 20 which are mounted closer to the inner race than to the outer, alternating with cross rods 22 which are closer to the outer race than to the inner.

Figure 3:
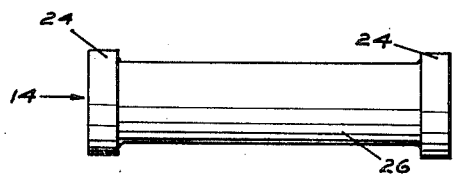
Figure 3 is a view of an anti-friction roller.

The rollers 14 are shown in detail in Figure 3 as formed with cylindrical ends 24 which roll on the races and a reduced central portion 26. Thus the rollers bear on the races adjacent their outer ends and clear the races in the center.

Figure 4:
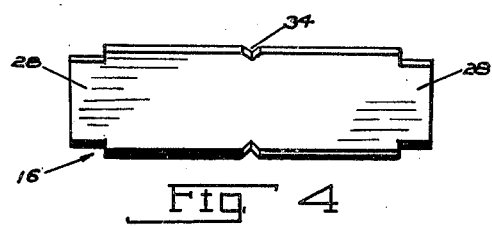
Figure 4 is a view of a gripper.
Figure 5:
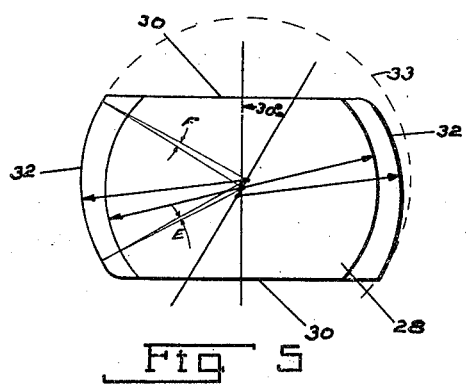
Figure 5 is an enlarged end view of a gripper illustrating the construction thereof.

The grippers as shown in Figures 4 and 5 include reduced ends 28 of substantially the same length as the ends 24 of the rollers and a center gripper portion formed with flat parallel sides 30 connected by arcuate portions 32 to form a generally parallelogram figure with diagonals of unequal length. As indicated in Figure 5 the arcuate portions 32 are formed about spaced centers eccentric to the center line of the gripper and lying on a line lying at 30° to a perpendicular to the surfaces 30, although they might be on the perpendicular or at any other suitable angle thereto. If desired, one or more oil grooves 34 may be formed in the surfaces 32 to facilitate flow of lubricant during over running and breaking down of the oil film between the grippers and races during clutching.

The surfaces 32 of the grippers are true arcs and the centers therefore are preferably so located as to produce a nearly constant wedge angle of less than 5°, which I have found to produce satisfactory gripping ability without excessive bursting force. The theoretical angle desired may be calculated from the formula sin F is equal to or less than $$\frac{M}{2}\left[\frac{R}{R+S}\times S\right]$$

where F is the angle between lines from the high point on the surface 32 through the center thereof and through the center of the gripper, M is the coefficient of friction or preferably a value somewhat less than the coefficient of friction, R is the diameter of the outer race and S is the diameter of the inner race. Since the angle F is defined by radii through the two centers it is the same as the wedge angle at the high point of the gripper and preferably is between 3° and 4°.

The angle E is defined by radii from the low point on the gripper through the same two centers and therefore equals the wedge angle at this point. In the illustrated example angle E will be between 2½° and 3½° but it will be obvious that this angle may be changed to any desired value without affecting the angle F by varying the position of the center of surface 32. It will, of course, be understood that the gripper design might be varied widely to meet varying conditions and that the above values are given only by way of example.

The grippers may be made in any desired way as by turning from bar stock, drawing through a die or the like. They are preferably hardened by heat treating or the like either before or after forming and may be finished by grinding or polishing after heat treatment. The dotted circle 33 in Figure 5 is a continuation of the surface 32 at the left and clearly illustrates that one of the surfaces 32 can be formed by a turning operation without interfering with the other surface.

The combined bearing and clutch may be lubricated in any desired manner as by flow of oil therethrough from the system of a machine with which it is used or by being sealed in oil. The dotted lines in Figure 2 indicate the flow of lubricant, it being noted that flow is around the reduced ends of the grippers and the reduced center portion of the rollers and also through the oil grooves in the grippers where these are employed. Since the reduced ends of the grippers are of substantially the same length as the enlarged ends of the rollers, there is no tendency for the grippers to roughen or mutilate the surfaces on which the ends of the rollers operate.

Figure 1:
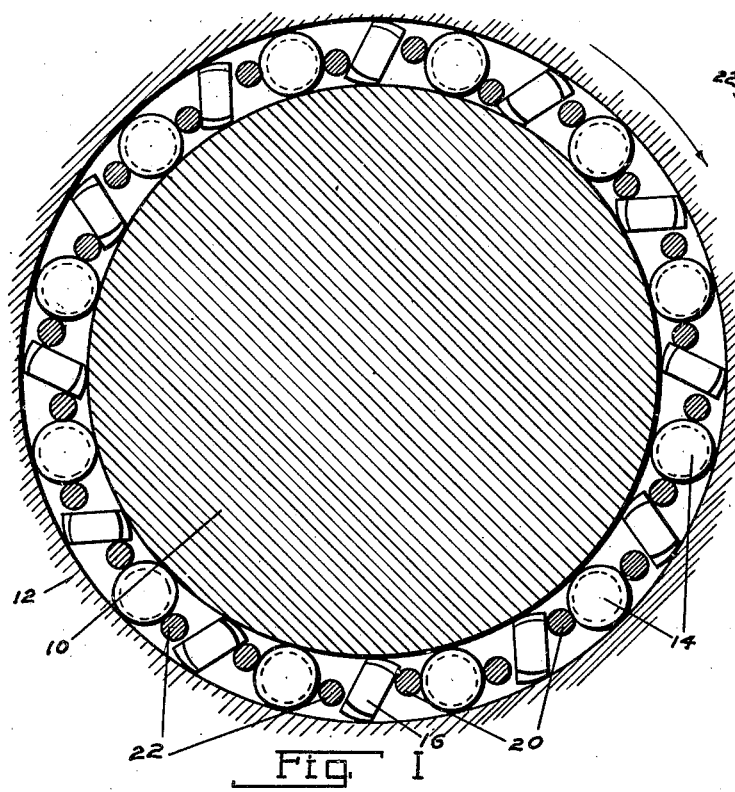
Figure 1 is a view with parts in section and parts in elevation of a combined bearing and one-way clutch embodying the invention.

In operation if the outer race is rotating faster than the inner race in the direction of the arrow in Figure 1 or if the inner race is rotating faster in the opposite direction, the grippers will tilt into the position shown in which their short diagonals lie on a radius between the races. The grippers are held in this position by the rods 20 and 22 and do not engage the races or engage them with such a light pressure as not to bind and the races are free to turn relatively on the rollers 14. If, however, the inner race tends to turn relatively faster in the direction of the arrow than the outer race or the outer race tends to turn relatively in the opposite direction, the grippers will be tilted to bring a portion of greater width into alinement with a radius, thus binding against the races and holding them against relative rotation. This action will be facilitated by the arrangement of the rods 20 and 22 at different distances from the center and under some circumstances one or the other of the rods may strike a gripper above or below its center, as the case may be, to tilt it quickly into engaging position. In any event the drag of the race will always assist in tilting the grippers and with the illustrated arrangement the use of springs is eliminated.

Figures 6 to 11 illustrate a modified construction in which the grippers are relatively thin with their ends merely rounded instead of being ground in the shape of the grippers shown in Figures 1 to 5. This construction embodies inner and outer concentric races 36 and 38 having rollers 40 and grippers 42 arranged between them. The grippers and rollers are held in place by a cage including annular rings 44 connected by rods 46 extending between the grippers and rollers to space them and hold them in proper relationship.

The rollers 40 as shown in Figures 8 and 9 include enlarged end portions to roll on the races and a reduced central portion to provide for the flow of lubricant. The grippers 42 are of relatively thin section with rounded edges as seen in Figure 11 and have reduced ends whose length is substantially the same as that of the enlarged ends of the rollers.

As shown in Figure 6 the grippers are arranged in groups of three between adjacent rods 46 although it will be apparent that the grippers might be arranged singly or in groups of some other number. When the inner race is rotating in a clockwise direction with respect to the outer race the grippers will tilt into the position shown in which they lie at an angle A to a radius and the races will be free to rotate relatively. Upon a reversal of the relative direction of rotation each gripper will tilt toward a radius thus increasing its effective length along a radial line to bind against the races and prevent relative rotation thereof. It will be noted that the rods 46 serve both to space the grippers and rollers and to hold the grippers against excessive tilting so that they are always in a position to engage the races quickly.

Figures 12 to 15 illustrate a modified construction of rollers and grippers, the rollers 48 of Figures 12 and 13 including enlarged end portions for engagement with the races and reduced central portions for the flow of lubricant. The grippers 50 of Figures 14 and 15 are relatively thin with rounded edges, rounded ends and grooves or notches 52 for the flow of lubricant. It will be noted that the rounded ends of the grippers 50 are formed on a radius substantially equal to the length of the enlarged ends of the rollers so that the grippers act on a portion of the races which is not engaged by the ends of the rollers. The grippers and rollers of Figures 12 to 15 operate in the same way as the grippers and rollers of Figures 6 to 11.

The grippers of Figures 10, 11, 14 and 15 may be manufactured from flat stock and cut to shape in a punch press or the like. The rounded edges thereof may be formed in any desired manner after the punching or other shaping operation but preferably a strip of stock of the desired width is drawn with rounded edges as in a die and the grippers cut from the strip. These grippers are thus very inexpensive to make and are extremely effective.

Figures 16 and 17 illustrate a modified arrangement including a different form of cage than that shown in the preceding figures, in which rollers 54 and grippers 56 of the form shown in Figures 1 to 5 and grippers 58 of the form shown in Figures 6 to 15 are arranged between concentric races 60 and 62. While two forms of grippers are illustrated in a single assembly it will be understood that both might be used or that either form might be used alone.

The grippers and rollers are held in place by a cage 64 formed of punched out sheet metal rolled into an annulus with its ends welded or otherwise joined together and with turned up flanges 66 at its edges. This cage functions in much the same manner as those described above, holding the rollers and grippers in spaced relationship and engaging the sides of the grippers when the grippers are at substantially the indicated angle B to a radius to prevent excessive tilting thereof during over running.

Figures 18 to 20 illustrate a reversible clutch arrangement including inner and outer races 70 and 72 having rollers 74 mounted therebetween. Between adjacent rollers are mounted oppositely facing grippers 76 and 78, the grippers 76 being adapted to prevent relative rotation of the races in one direction and the grippers 78 acting in the opposite direction.

The rollers and grippers are held in place by a cage 80 adjacent the inner race and a cage 82 connected to the cage 80 and lying approximately in the center of the space between the two races. It will be noted that the cage 80 has openings for each of the rollers and grippers but that the cage 82 has no cross member between adjacent grippers. By this arrangement the cage 80 serves to hold the inner ends of the grippers in place and the cage 82 serves only to locate the rollers and to prevent excessive tilting of the grippers in the over running position.

In order to control which of the sets of grippers 76 or 78 shall be effective and consequently in which direction over running will be permitted, a third cage 84 is provided adjacent the outer race having cross members extending between adjacent grippers 76 and 78. The cage 84 has an outwardly turned flange 86 at one edge and an inwardly turned flange 88 at the other edge and is provided with sloping cam slots 90 into which pins 92 extend. The pins 92 are carried by the cages 80 and 82 so that axial shifting of the cage 84 will produce a rotation thereof relative to the cages 80 and 82. The cage 84 is shifted by means of a suitable shifting collar 94 rotatably engaging the inturned flange 88.

When the cage 84 is in the position shown in Figures 18 to 20 it engages the outer ends of the grippers 76 and holds them tilted in the released position. Thus the grippers 76 are ineffective in either direction and the outer race may rotate counterclockwise relative to the inner race but will be held against relative clockwise direction by the grippers 78. To reverse the direction in which the clutch is effective the cage 84 may be shifted to move the pins 92 to the opposite ends of slots 90 and turn the cage 84 into engagement with the grippers 78. In this position the grippers 78 will be held in over-running position and the outer race may over run the inner race in a relatively clockwise direction but will be held against rotation in the opposite direction by the grippers 76. When the cage 84 is moved to a central position it does not engage either of the sets of grippers 76 or 78 and both sets are effective to prevent relative rotation of the races in either direction.

If it is desired to lock out both sets of grippers so that the races may rotate relatively in either direction, a cage 96 (Figure 21) may be substituted for the cage 84. The cage 96 includes cross members 98 having on opposite sides thereof and adjacent opposite ends, projecting cam portions 100 and 102. In order to guide the cage 96, it is provided with axial slots 104 through which the pins 92 project.

In operation, when the cage 96 is in the central position shown in Figure 21, cam portions 100 will engage the grippers 76 and cam portions 102 will engage the grippers 78 to hold both of the sets of grippers in over-running position so that neither set is effective and the races can rotate relatively in either direction. If the cage 96 is shifted to the right the cam portions 100 will remain in engagement with the grippers 76 but the cam portions 102 will move out of engagement with the grippers 78. In this position the grippers 76 are ineffective but the grippers 78 will be effective to prevent relative rotation of the races in one direction. If the cage 96 is shifted to the left the cam portions 102 will engage the grippers 78 to hold them in over-running position but the cam portions 100 will be out of engagement with the grippers 76 and the grippers 76 will be effective to prevent relative rotation of the races in the opposite direction.

Figure 22 is a perspective view of a cage or retainer cast or otherwise suitably formed from a single piece of metal and comprising annular end rings 106 connected by spaced cross members 108. This cage may be used in place of the cage of Figures 1 to 15 or the stamped sheet metal cages of Figures 16 to 21.

While several embodiments of the invention have been shown and described, it will be apparent that changes might be made therein and it is not intended to be limited to the forms shown or otherwise than by the terms of the appended claims.

What is claimed is:

1. A combined one-way clutch and bearing comprising inner and outer concentric races, a series of anti-friction elements between said races, and a series of grippers between said races to engage therewith and prevent relative rotation thereof in one direction, said elements having reduced central portions out of engagement with the races and said grippers having reduced end portions out of engagement with the races.

2. A combined one-way clutch and bearing comprising inner and outer concentric races, a series of anti-friction elements between said races, and a series of grippers alternating with said anti-friction elements between said races to engage with the races and prevent relative rotation thereof in one direction, said elements having enlarged cylindrical end portions engageable with the races and said grippers having reduced end portions registering with the enlarged end portions of the elements and out of engagement with the races.

3. A combined bearing and one-way clutch comprising inner and outer concentric races, a cage including spaced rods mounted between said races, anti-friction rollers between alternate pairs of said rods, and grippers between the remaining pairs of rods to engage the races and prevent relative rotation thereof in one direction.

4. A combined bearing and one-way clutch comprising inner and outer concentric races, a cage including spaced rods mounted between said races, anti-friction rollers between alternate pairs of said rods, said rollers having central portions of reduced diameter, and grippers between the other pairs of rods and having reduced end portions whereby lubricant may flow around the reduced ends of the grippers and the reduced central portions of the rollers.

5. A combined bearing and one-way clutch comprising inner and outer concentric races, a cage including spaced rods mounted between said races, anti-friction rollers between alternate pairs of said rods, said rollers having central portions of reduced diameter, and grippers between the other pairs of rods and having reduced end portions and reduced central portions whereby lubricant may flow around the central portions of the grippers and rollers and the ends of the grippers.

6. A combined bearing and one-way clutch comprising inner and outer concentric races, anti-friction elements between said races, and grippers between said races, said elements and grippers having reduced portions for the flow of lubricant.

7. A combined bearing and one-way clutch comprising inner and outer concentric races, a cage between said races including a plurality of spaced rods, alternate ones of said rods lying at different distances from the center of said races, anti-friction elements between alternate pairs of rods, and grippers between the other pairs of rods.

8. A combined bearing and one-way clutch comprising inner and outer concentric races, a cage between said races including a plurality of spaced rods, alternate ones of said rods lying at different distances from the center of said races, and grippers between pairs of said rods to prevent relative rotation of the races in one direction, the rod of each pair engaging that face of a gripper which faces in the direction in which relative rotation of the outer race is prevented being closer to the center of the races than the other rod of the pair.

9. A one-way clutch comprising inner and outer concentric races, a cage between said races including spaced rods, and grippers between pairs of said rods rockable in one direction to lock the races against relative rotation and in the other direction to release the races, one rod of each pair lying closer to the inner race than to the outer race.

10. In a one-way clutch, a gripper comprising an elongated member having flat substantially parallel sides joined by arcuate portions having spaced centers and reduced ends to provide a space for lubricant flow.

11. A combined bearing and one-way clutch comprising concentric cylindrical races and anti-friction elements and grippers between said races, said elements and grippers having staggered cut away portions whereby the grippers engage a different part of the surfaces of the races than that engaged by the elements.

12. A clutch mechanism comprising inner and outer concentric races having smooth cylindrical facing surfaces, a set of grippers between said races and engageable with said surfaces to prevent relative rotation thereof in one direction, a second set of grippers between the races and engageable with said surfaces to prevent relative rotation thereof in the opposite direction, and means for selectively rendering either of said sets of grippers inoperative at will thereby to control the direction in which relative rotation of the races is prevented.

13. A clutch mechanism comprising inner and outer concentric races, a set of grippers between said races and engageable therewith to prevent relative rotation thereof in one direction, a second set of grippers between the races and engageable therewith to prevent relative rotation thereof in the opposite direction, and adjustable means movable selectively into engagement with either of said sets of grippers to render said set of grippers ineffective or out of engagement with both of said sets of grippers whereby both sets are effective.

14. A clutch mechanism comprising inner and outer concentric races, a set of grippers between said races and engageable therewith to prevent relative rotation thereof in one direction, a second set of grippers between the races and engageable therewith to prevent relative rotation thereof in the opposite direction, and adjustable means movable selectively into engagement with either of said sets of grippers to render said set of grippers ineffective or into engagement with both of said sets of grippers to render both sets ineffective at the same time.

15. A clutch mechanism comprising inner and outer concentric races, a set of grippers between said races and engageable therewith to prevent relative rotation thereof in one direction, a second set of grippers between the races and engageable therewith to prevent relative rotation thereof in the opposite direction, a cage to hold said sets of grippers in spaced relationship, and a second cage movable relatively to said first cage for selectively tilting either of said sets of grippers into ineffective position.

16. A combined clutch mechanism and bearing comprising inner and outer concentric races having smooth cylindrical facing surfaces, a set of grippers between said races and engageable with said surfaces to prevent relative rotation thereof in one direction, a second set of grippers between the races and engageable with said surfaces to prevent relative rotation thereof in the opposite direction, anti-friction elements between said races and engageable therewith to facilitate relative rotation thereof and means for selectively rendering either of said sets of grippers inoperative at will thereby to control the direction in which relative rotation of the races is prevented.

17. A clutch mechanism comprising inner and outer cylindrical concentric races, means engageable therewith to prevent relative rotation of the races in one direction, means engageable therewith to prevent relative rotation of the races in the other direction, and control means shiftable axially of the races for selectively rendering one of said means operative and the other means inoperative or for rendering both of said means inoperative simultaneously.

18. A combined clutch mechanism and bearing comprising inner and outer cylindrical concentric races, anti-friction elements between said races, means between said races for preventing relative rotation thereof in one direction, means between said races for preventing relative rotation thereof in the other direction, and control means for selectively rendering either or both of said means inoperative at will.

ADIEL Y. DODGE.